United States Patent [19]
Saito et al.

[11] Patent Number: 5,720,024
[45] Date of Patent: Feb. 17, 1998

[54] HIGHLY RELIABLE DISTRIBUTED COMPUTING SYSTEM

[75] Inventors: Masahiko Saito; Takanori Yokoyama; Masaru Shimada, all of Hitachi, Japan

[73] Assignee: Hitachi, Ltd., Tokyo, Japan

[21] Appl. No.: 30,547

[22] Filed: Mar. 12, 1993

[30] Foreign Application Priority Data

Mar. 16, 1992 [JP] Japan .................................. 4-057730

[51] Int. Cl.$^6$ .................................................. G06F 11/34
[52] U.S. Cl. ................................. 395/180; 395/182.08
[58] Field of Search .............................. 395/575, 180, 395/182.08, 182.02; 371/7, 11.1, 19

[56] References Cited

U.S. PATENT DOCUMENTS

| | | | |
|---|---|---|---|
| 4,029,952 | 6/1977 | Giras et al. | 235/151.21 |
| 4,321,666 | 3/1982 | Tasar et al. | 364/200 |
| 4,356,546 | 10/1982 | Whiteside et al. | 364/200 |
| 5,271,023 | 12/1993 | Norman | 371/68.3 |
| 5,327,553 | 7/1994 | Jewett et al. | 395/575 |

FOREIGN PATENT DOCUMENTS 62-135951  6/1987  Japan .

OTHER PUBLICATIONS

"Distributed Systems", Edited by S. Mullender, ACM Press, NY.

Primary Examiner—Phung Chung
Attorney, Agent, or Firm—Antonelli, Terry, Stout, & Kraus, LLP

[57] ABSTRACT

In a distributed computing system consisting of a plurality of computers each holding the computer reliability of its own, one of the computers includes a reliability management program, This reliability management program manages the program reliability required for each of a plurality of programs to be executed in the system. The reliability management program includes the steps of inquiring the computer reliability of each of the other computers to receive the computer reliability held in each of the other computers thereby preparing a computer information table, searching the table to find the values of the computer reliability of the computers corresponding to those of the program reliability of the individual programs, and allocating, on the basis of the result of the search, the individual programs to the individual computers.

17 Claims, 6 Drawing Sheets

| PROGRAM NAME | RELIABILITY | EXECUTABLE FILE |
|---|---|---|
| PROGRAM 133 | 80 | / usr / local / bin / netcontrol |
| PROGRAM 134 | 67 | / usr / manager / trainctrl |
| PROGRAM 136 | 35 | / usr / local / bin / X11 / uwm |
| PROGRAM 137 | 25 | / usr / local / bin / emacs |
| PROGRAM 132 | 21 | / usr / bin / vi |
| PROGRAM 131 | 8 | / usr1 / saitoh / a.out |
| PROGRAM 135 | 3 | / usr1 / shimada / a.out |

| COMPUTER NAME | RELIABILITY | COMPUTER ADDRESS |
|---|---|---|
| COMPUTER 121 | 10 | 133.144.3.255 |
| COMPUTER 122 | 90 | 133.144.3.1 |
| COMPUTER 123 | 70 | 133.144.3.20 |
| COMPUTER 124 | 20 | 133.144.3.55 |
| COMPUTER 125 | 37 | 133.144.3.233 |

FIG. 7

HIGHLY RELIABLE DISTRIBUTED COMPUTING SYSTEM

BACKGROUND OF THE INVENTION

This invention relates to a distributed computing system consisting of a plurality of computers connected to a network so as to execute a plurality of programs.

In such a distributed computing system in which a plurality of computers are connected to a network so as to enhance the flexibility and extensibility of the system as desired, it is a common practice to prepare a management table and a management program used to control a process according to the management table, so that both hardware and software constructing and operating the individual computers can be wholly managed.

A prior art distributed computing system consisting of a plurality of computers is disclosed in JP-A-62-135951. The disclosed distributed computing system has been such that one of the computers is selected as a master computer which activates a management program provided for the management of processing on each computer in the whole system, thereby executing the desired distributed computing according to loads on the other slave computers. However, the disclosed prior art distributed computing system has had the requirement that the reliability of such a management program must be far more higher than that of other user programs. That is, the prior art distributed computing system has had the problem that, when the master computer fails to properly operate, and the execution of the management program is stopped, the whole system is adversely affected by the failure of the master computer.

On the other hand, a distributed computing system based on the idea of software multiplication so as to increase the reliability of the system is disclosed in a paper entitled "S. Mullender: Distributed Systems, Chapter 15, pp. 319–367, ACM PRESS". The principle of the disclosed distributed computing system has been such that the same management program is allocated to each of at least two computers including a master computer to activate both of them at the same time, so that, when the master computer fails to properly operate, the slave computer can take over the job of processing according to the management program.

However, in the latter prior art distributed computing system in which the slave computer takes over the job of processing according to the management program when the master computer is disabled, the slave computer must carry out the required processing according to the management program in addition to the execution of its computing process programmed to be primarily executed by itself. Further, there is the necessity for continual communication between the management program on the slave computer and the management program on the master computer so as to ensure consistency between them. Therefore, the latter prior art distributed computing system has also had the problem that an undesirable reduction of the performance of the whole system tends to occur.

SUMMARY OF THE INVENTION

It is an object of the present invention to provide a highly reliable distributed computing system which is free from the tendency of occurrence of an undesirable reduction of the performance of the whole system.

According to an embodiment of the present invention which attains the above object, each of a plurality of computers forming the system includes means for holding beforehand the computer reliability of its own, and a plurality of programs to be executed in the distributed computing system are allocated to the individual computers on the basis of the values of the computer reliability held in the individual computers respectively. Further, in order to reliably allocate the plural programs to the individual computers, it is desirable that one of the computers forming the distributed computing system includes means for storing a reliability management program. This reliability management program is used to manage the program reliability representing the reliability required for each of the individual programs to be executed in the distributed computing system. By this reliability management program, the computer reliability of each of the other computers is inquired, and, as a result of the inquiry, the values of the computer reliability held in the other computers are received to prepare a computer reliability table, that is, a computer information table. Then, by the reliability management program, the computer information table is searched to find the values of the computer reliability corresponding to those of the program reliability of the individual programs, and, on the basis of the result of this search, the individual programs are then allocated to the individual computers respectively. Thus, the desired highly reliable distributed computing system can be provided.

According to another embodiment of the present invention, reliability flags are additionally provided so that whether each program in a plurality of programs is a special program requiring high reliability or an ordinary program not requiring such high reliability can be easily identified. On the basis of the indication by the reliability flag, the special program is executed by a fault tolerant computer provided in the system, while the ordinary program is executed by an ordinary computer provided in the system. Thus, the desired highly reliable distributed computing system can be provided.

DESCRIPTION OF THE PREFERRED EMBODIMENTS

Figure 1:
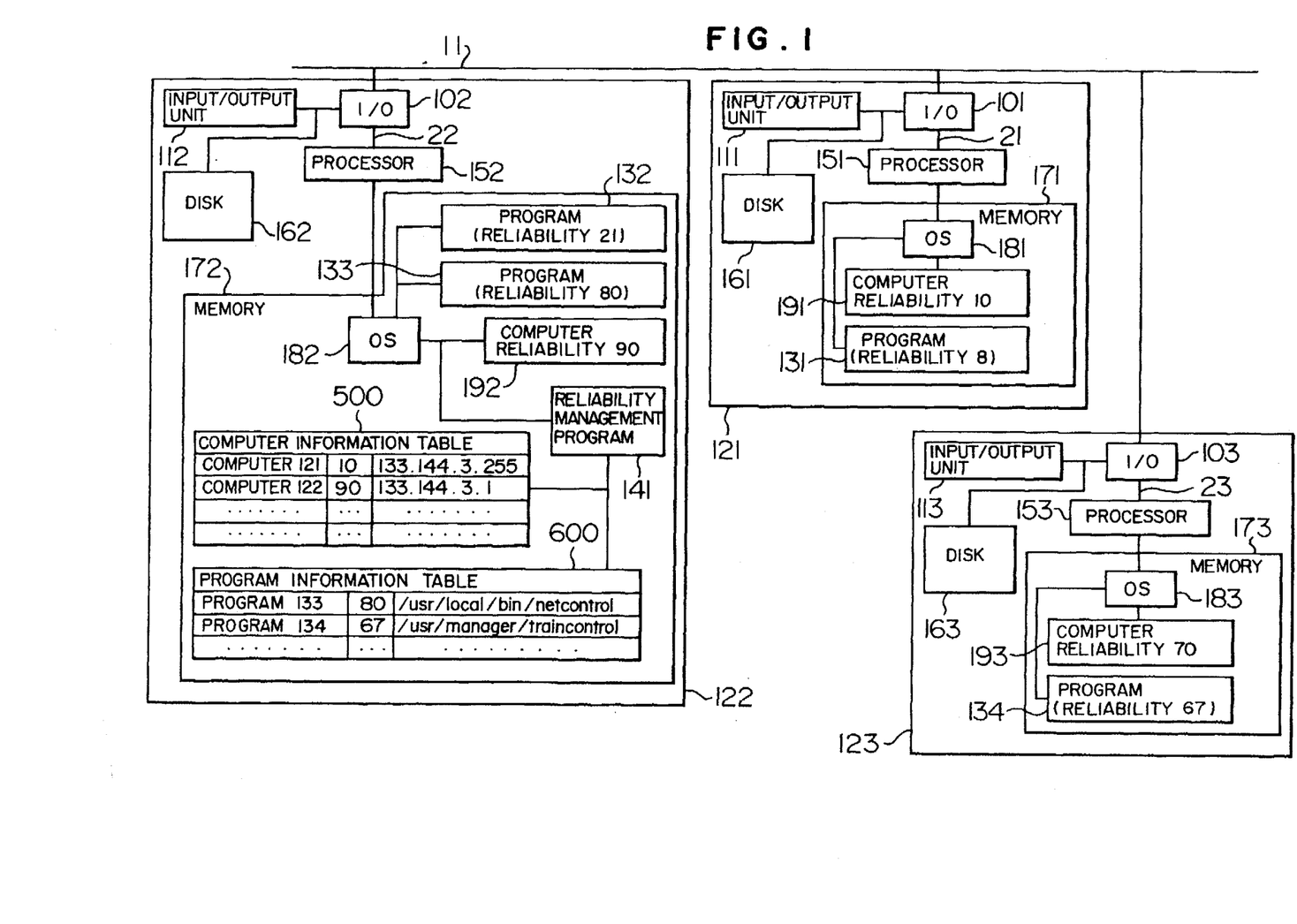
FIG. 1 is a block diagram showing the general structure of an embodiment of the distributed computing system according to the present invention.

Preferred embodiments of the present invention will now be described by reference to the drawings. FIG. 1 shows the general structure of an embodiment of the distributed computing system according to the present invention. Referring to FIG. 1, a plurality of computers 121 to 123 are connected to a network 11 through I/O interfaces 101 to 103 provided in the computers 121 to 123 respectively. Processors 151 to 153 are controlled by OS's 181 to 183 stored in memories 171 to 173 mounted in the computers 121 to 123 respectively. The processors 151 to 153 execute programs 131 to 134 stored in the respective memories 171 to 173 after the programs are supplied from input/output units 111 to 113 used by the user for the input and output of data or supplied from the network 11 or supplied from disks 161 to 163. Further, the values of reliability of the computers 121 to 123 of their own are stored beforehand in the memories 171 to 173 respectively. This computer reliability will be described later. Also, a reliability management program 141 is stored in the memory 172 of the computer 122. A computer information table 500 showing the values of the computer reliability of the individual computers and a program information table 600 showing the values of the program reliability of the individual programs are managed by the reliability management program 141.

In the system initialization mode, this reliability management program 141 is first activated. By comparing the value of the computer reliability of each of the individual computers with the value of the program reliability required for a program to be executed, the reliability management program 141 selects the computer most suitable for the execution of that program, and the selected computer executes the program. The program reliability will also be described later. Communication buses 21 to 23 connect the I/O interfaces 101 to 103 to the processors 151 to 153, memories 171 to 173, input/output units 111 to 113, and disks 161 to 163 respectively.

An example of computation of the computer reliability will now be described. The computer reliability of each of the computers 121 to 123 depends upon duplication or triplication, as desired, of the processors 151 to 153, disks 161 to 163, communication buses 21 to 23, etc.

Herein, the symbols Fp, Xp, Fd, Xd, Fc and Xc are used to designate the error rate of the processor itself, the total (i.e., multiplexed) number of the processors (arranged in duplication or triplication), the error rate of the disk itself, the total (i.e., multiplexed) number of the disks (arranged in duplication or triplication), the error rate of the communication bus (internal bus) itself, and the total (i.e., multiplexed) number of the communication buses (arranged in duplication or triplication), respectively. Then, when the symbols P, C and D are used to designate the weights of failures of the processors, disks and communication buses respectively, the computer reliability is expressed as follows:

$$\text{Computer reliability}=100-(P \times Fp^{\wedge}Xp+D \times Fd^{\wedge}Xd+C \times Fc^{\wedge}Xc)$$

In the above expression, the term X^Y designates the Yth power of X. Further, the values of the error rates Fp, Fd and Fc satisfy the following inequality:

$$0<Fp, Fd, Fc<1$$

The term Fp^Xp represents the probability where all of the plural processors fail to properly operate. Because the error rate Fp satisfies the above inequality, the probability (Fp^2, Fp^3) where the duplication or triplication arrangement of the processors results in an abnormal operation of all the processors is lower than the probability (Fp) where the processors are not arranged in duplication or triplication.

Even in the case of ordinary computers, the computer reliability of a large scale computer differs from that of a work station because of the differences in the error rates of their processors, disks and communication buses. Therefore, at the time of constructing the distributed computing system, the aforementioned values of the computer reliability of the individual computers 121 to 123 are stored beforehand in the memories 171 to 173 respectively.

Also, the program reliability required for each of the programs is provided for that program. The method for providing the required program reliability is classified into a method in which the program reliability is determined according to the kind of the program and a method in which the program reliability is determined by the user who activates the program.

In the case of the method determining the program reliability according to the kind of the program, the program reliability is determined already before the activation of the program according to the kind of the program and is described on a program executable file itself or a table or the like. For example, according to a rule which will be described now, the program reliability corresponding to a selected program is determined as follows:

(1) Management program: Its program reliability has a Value larger than and including 80. An example of this program is a system management program.

(2) Service program: Its program reliability has a value larger than and including 70 but smaller than 80. Examples of this program are a communication management program and a security management program.

(3) Application program (high grade): Its program reliability has a value larger than and including 60 but smaller than 70. Examples of this program are a salary calculation program and a train service management program.

(4) Application program (low grade): Its program reliability has a value larger than and including 50 but smaller than 60. Examples of this program are a printer control program and a graphics control program.

(5) User program: Its program reliability has a value smaller than 50. An example of this program is a conventional user program.

In the case of the method determining the program reliability by the user who activates that program, the user sets the values of the program reliability for all the programs activated by the user. For example, the user who sets the program reliability is classified into a system manager, a high class user and a low class user. In such a case, all the programs activated by the system manager require the program reliability value as large as 80, while all the programs activated by the high class user require the program reliability value as large as 50, and all the programs activated by the low class user require the program reliability value as large as 20.

Thus, the following program reliability values are required:

(1) System manager: The value of the program reliability is 80.

(2) High class user: The value of the program reliability is 50.

(3) Low class user: The value of the program reliability is 20.

The program can be executed only by the computer having the computer reliability value larger than and including the program reliability value required for the program itself. That is, in FIG. 1, the required program reliability value of the program 133 is 80, and the computer 122 having the computer reliability value of 90 can only execute the program 133. On the other hand, in the case of the program 131 having the program reliability value of only 8, this program 131 can be executed by any one of the computers having the computer reliability value larger than 8, that is, by all the computers. Thus, by providing the values of both the computer reliability and the program reliability for all the computers and programs respectively, any desired program can be executed on the computer having the required computer reliability.

Figure 2:
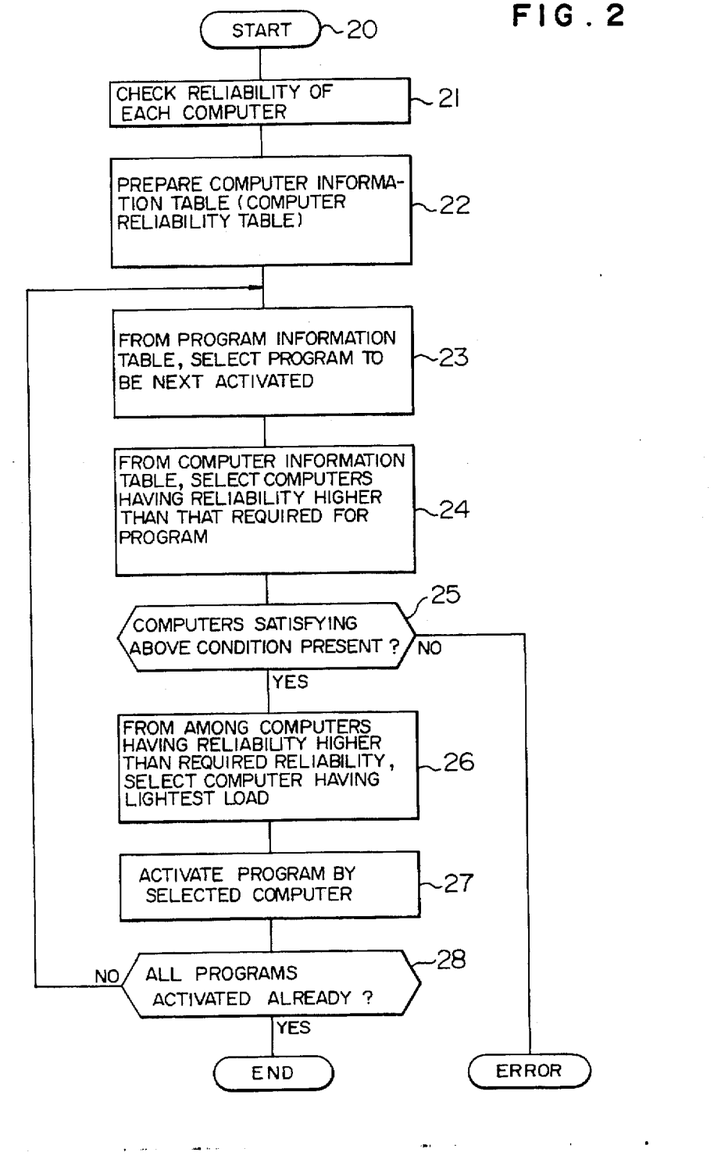
FIG. 2 is a flow chart of the steps of processing according to the reliability management program used in the embodiment shown in FIG. 1.
Figure 3:
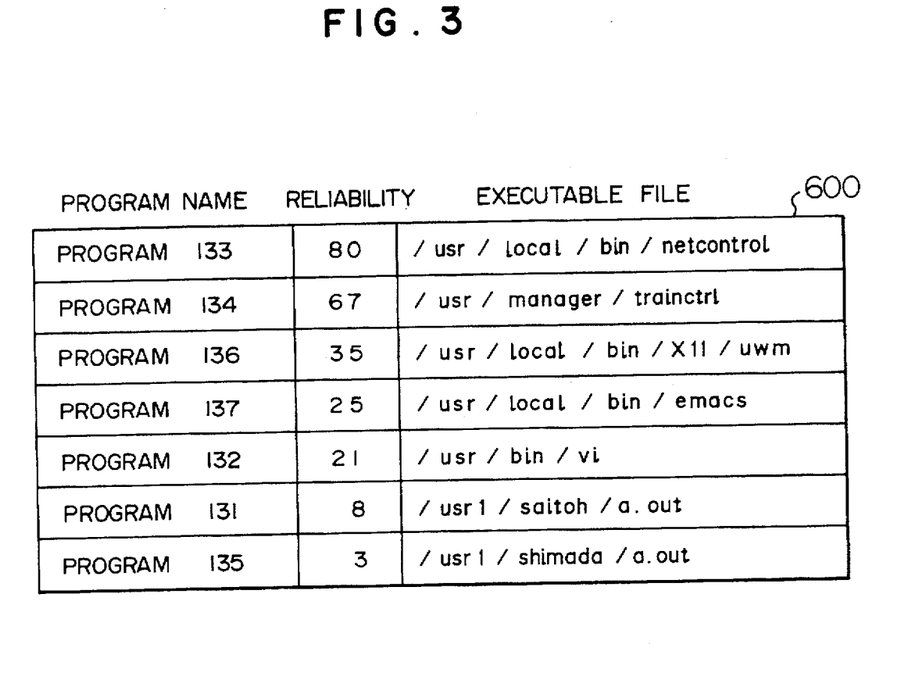
FIG. 3 shows the arrangement of one form of the program information table used in the embodiment shown in FIG. 1.

The reliability management program 141 manages both the computer information table 500 and the program information table 600 so as to activate the programs 131 to 134 shown in FIG. 1. FIG. 2 is a flow chart of steps of processing according to the reliability management program 141, and FIG. 3 shows an example of the contents of the program information table 600. In the program information table 600, a series of program information are arranged in the order of program activation, and each program information includes the name of the program, the program reliability value and the position of the program executable file. By the reliability management program 141, one program after another is selected from the program information table 600 so as to be successively activated. This program information table 600 is made by the system designer to include the programs to be activated in the system initialization mode.

Figure 4:
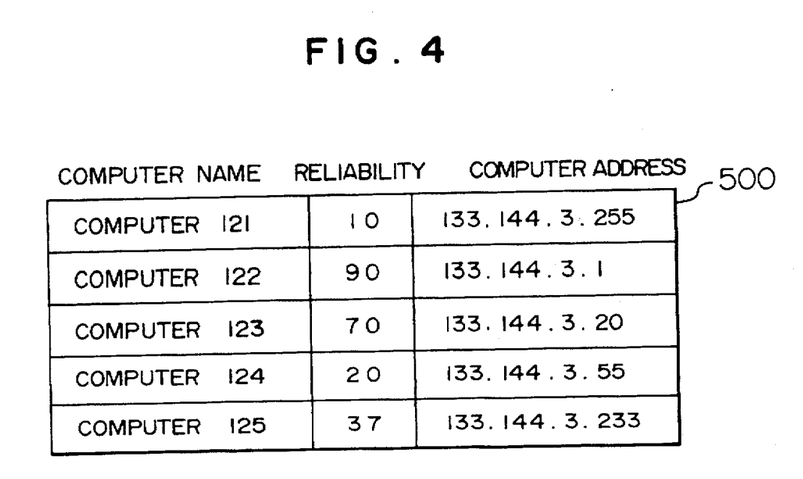
FIG. 4 shows the arrangement of one form of the computer information table used in the embodiment shown in FIG. 1.

FIG. 4 shows an example of the contents of the computer information table 500. In this computer information table 500, each of a series of computer information includes the name of the computer, the computer reliability value and the computer address for communication with the other computers. Thus, by searching the computer information table 500, the computer having its computer reliability value larger than that required for a desired program can be reliably selected.

The sequence of processing 20 done until a plurality of programs are executed in the embodiment of the distributed computing system according to the present invention will now be described by reference to the flow chart of FIG. 2. In a first step 21 of the reliability management program 141, the computer reliability of each computer is checked. In this step 21 of the reliability management program 141, a broadcast message is sent to each of the computers connected in the network 11 to receive the reply indicating the computer reliability stored in each of them. In the next step 22 of the reliability management program 141, the values of the computer reliability acquired from the individual computers are based to prepare the computer information table 500. Then, in the next step 23 of the reliability management program 141, a program to be activated is selected from the program information table 600 to acquire the value of the program reliability of that program. In the next step 24 of the reliability management program 141, the computer information table 500 is searched so as to select the computers having the computer reliability values larger than the program reliability value required for that program. Whether the computers satisfying the required condition are present or not is checked in the next step 25. When the result of checking in the step 25 is "No", an error is indicated. On the other hand, when the result of checking in the step 25 proves that there are the computers having the computer reliability value larger than the value of the required program reliability, the computer having a load lightest among the selected computers is selected in the next step 26. Then, in the next step 27, the program is activated on the selected computer. In the next step 28, whether all the programs in the program information table 600 have already been activated or not is checked. When the result of checking in the step 28 is "Yes", the processing according to the reliability management program 141 is ended. On the other hand, when the result of checking in the step 28 proves that a program or programs to be activated are still left, the steps 23 to 28 are repeated again.

Figure 5:
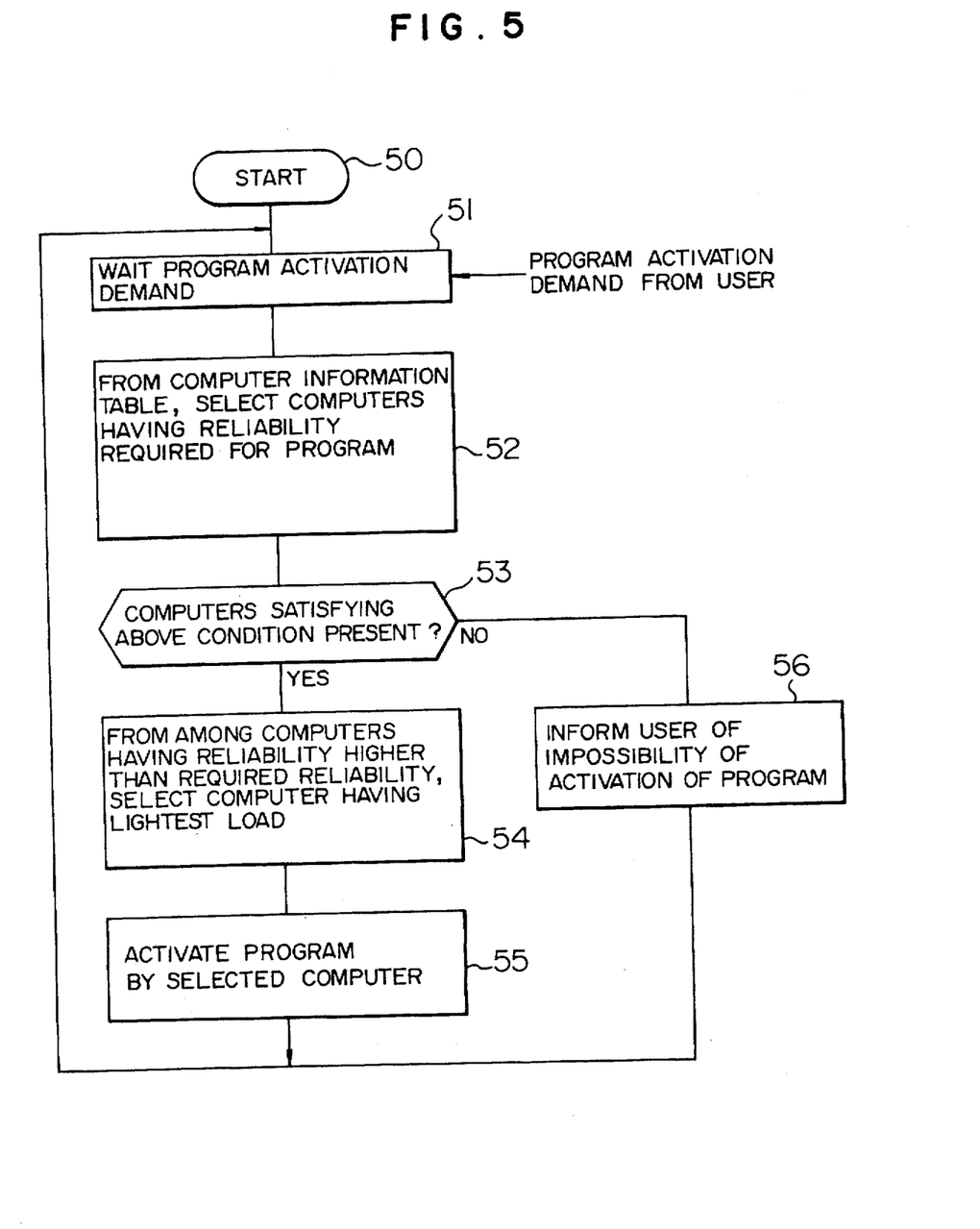
FIG. 5 is a flow chart of the steps of processing when a user program is added to the reliability management program shown in FIG. 2.

Thus, by carrying out the processing 20 shown in FIG. 2, each of the programs 131 to 134 in the program information table 600 is activated by the computer having the computer reliability value corresponding to the value of the required program reliability. However, the programs to be activated are only those described in the program information table 600 already, and there may be a case where a program to be activated is added later by the user. FIG. 5 shows the steps of processing 50 to deal with such a case. After all the programs described in the program information table 600 have been activated, the reliability management program 141 waits for later application of a program activation command from the user in its step 51. This state of waiting is released after the program activation command is applied from the user. The user specifies both the program to be activated and the value of the program reliability required for that program. When the user does not specify the program reliability value at the time of application of the program activation command, the program can be activated by any one of the computers. In this case, steps 52, 53 and 56 following the step 51 are not executed.

Referring to FIG. 5, in the step 52 the computer information table 500 is searched on the basis of the value of the program reliability specified by the execution of the reliability management program 141 so as to select the computers having the computer reliability values larger than the value of the program reliability required for the program. In the next step 53, whether the computers satisfying the above condition are present or not is checked. When the result of checking in the step 53 is "No", an error is indicated, and, in the step 56, the user is informed of the absence of the computer capable of activating the program. On the other hand, when the result of checking in the step 53 proves that there are the computers having the computer reliability values larger than the program reliability value required for the program, the computer having a load lightest among the selected computers is selected in the next step 54, and the program is activated on the selected computer in the next step 55. Thereafter, the step 55 is followed by the step 51 waiting later application of the program activation command by the user again.

The processing 20 according to the reliability management program 141 may be executed by the system manager.

Figure 6:
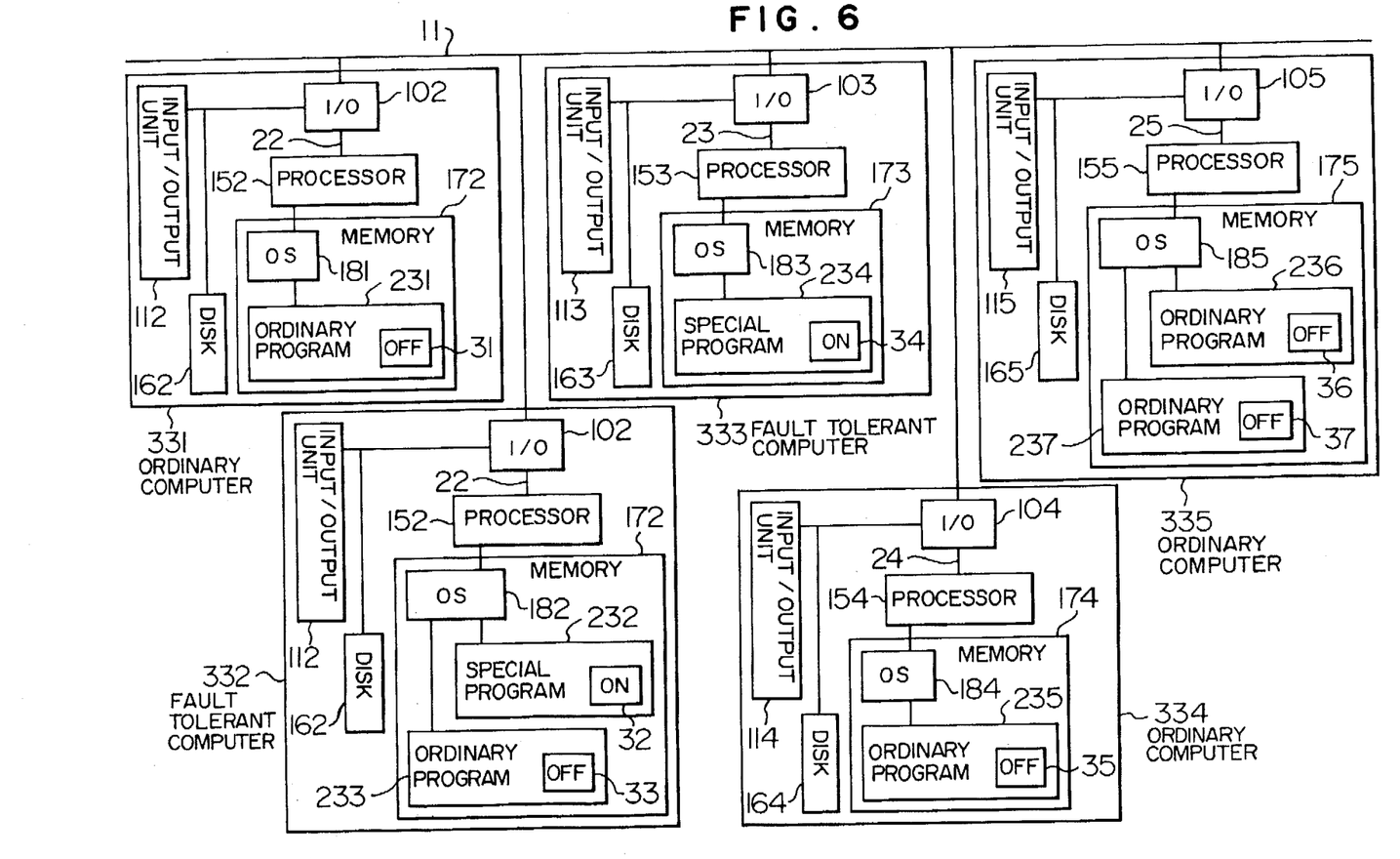
FIG. 6 is a block diagram showing the general structure of another embodiment of the present invention.

FIG. 6 shows the general structure of another embodiment of the present invention, and, in FIG. 6, like reference numerals as in FIG. 1 are used to designate the same parts appearing in FIG. 1. The distributed computing system shown in FIG. 6 includes fault tolerant computers 332 and 333 whose computer reliability is greatly increased as compared to that of ordinary computers 331, 334 and 335 by means of duplication or triplication of their processor, disk, communication bus, etc. The ordinary computers 331, 334 and 335 include a work station, a minicomputer, a large scale computer, etc., but their computer reliability is not especially high.

Special programs 232 and 234 are provided to be distinguished from ordinary programs 231, 233, 235, 236 and 237 by reliability flags 31, 32, 33, 34, 35, 36, and 37 provided for the individual programs respectively. When any one of the reliability flags 31 to 37 provided for the individual programs is in its on state, the corresponding program is the special program, while when any one of the reliability flags 31 to 37 is in its off state, the corresponding program is the ordinary program. The reliability flag 31, 32, 33, 34, 35, 36 or 37 of the desired program to be executed is checked according to the reliability management program 141, and, when that program is proved to be the special program, the fault tolerant computer 332 or 333 executes that program. On the other hand, when that program is proved to be the ordinary program, any one of the computers including the fault tolerant computers 332, 333 and the ordinary computers 331, 334, 335 executes that program. Thus, by the provision of the reliability flags 31 to 37, whether or not the high reliability is required for the program can be decided, So that the program requiring the high program reliability can be executed by the fault tolerant computer 332 or 333 only.

Figure 7:
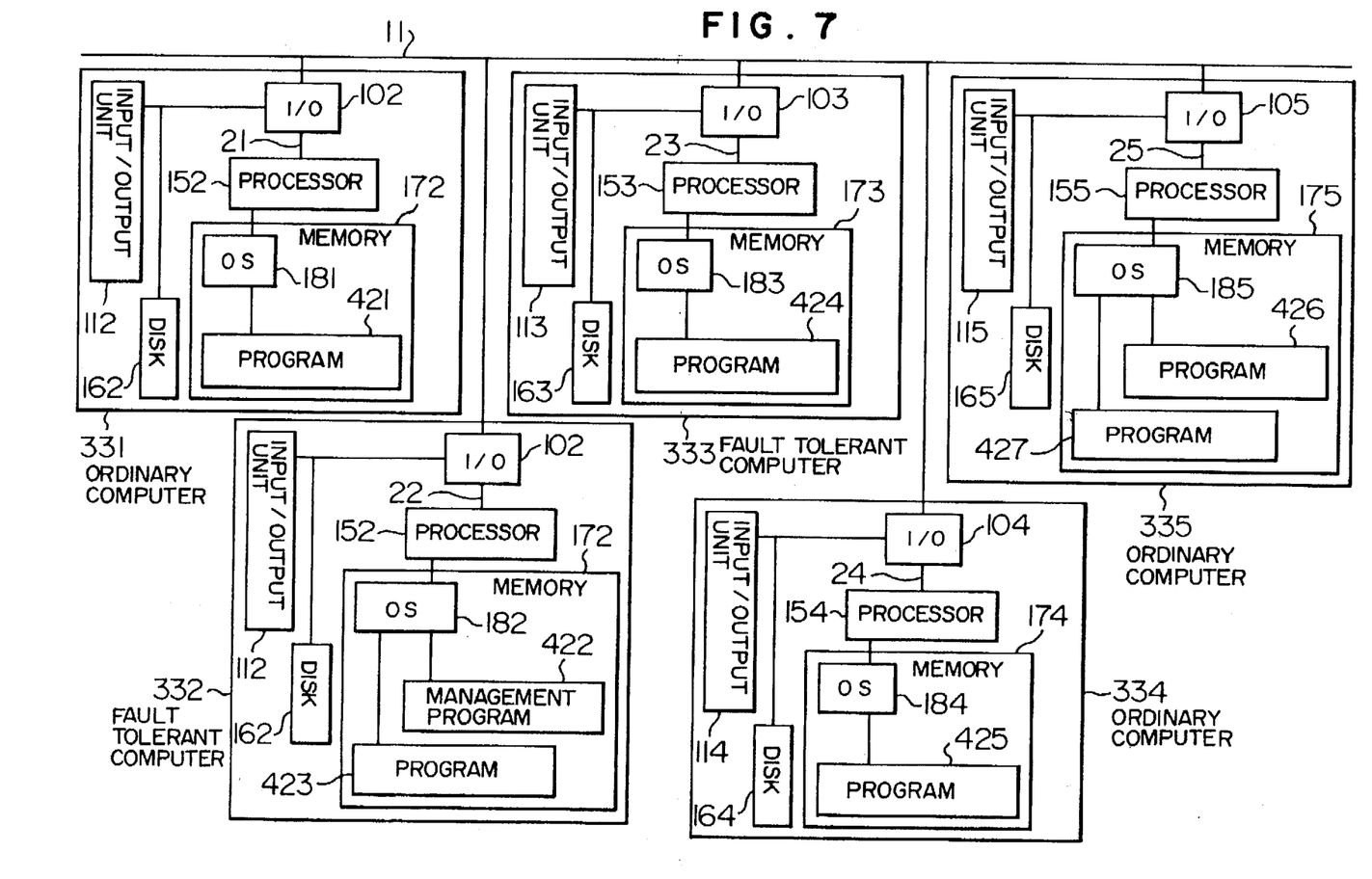
FIG. 7 is a block diagram showing the general structure of still another embodiment of the present invention.

FIG. 7 shows the general structure of still another embodiment of the present invention, and, in FIG. 7, like reference numerals as in FIG. 1 are used to designate the same parts appearing in FIG. 1. Programs 421, 423, 424, 425 and 426, 427 are activated on individual computers 331, 332, 333, 334 and 335 respectively. There is a management program 422 so as to manage the hardware or software of the ordinary computers 331, 334, 335 and fault tolerant computers 332, 333 connected to the network 11. An example of this management program 422 is a hardware management program which manages the performance of each of the computers, input/output units, etc. connected to the network 11 and specifies the computer most suitable for the execution of the program. Another example of the management program 422 is a software management program which manages service programs provided on the individual computers and selects a suitable service program that meets the demand of the user program. Basically, the same kind of the management program 422 that is activated in the system is only one. Such a management program 422 is executed by one of the fault tolerant computers 332 and 333. Thus, the reliability of the management program 422 can be made higher than that in usual distributed computing systems.

The manner of management as described by reference to FIGS. 6 and 7 can be effected when the reliability management program 141 shown in FIGS. 1 to 5 is used. In this case, the value that can be taken for the reliability is limited to that of the binary notation (0 and 1).

It will be understood from the foregoing description of various embodiments of the present invention that the reliability of the whole distributed computing system can be improved without lowering the performance of the whole system.

What is claimed is:

1. A highly reliable distributed computing system comprising:

a plurality of computers which are connected to a network for executing a plurality of programs, wherein each computer of said plurality of computers has a holding means for holding a computer reliability value representing a reliability of said computer, and wherein one of said plurality of computers has a selecting means for automatically selecting, as to each program of said plurality of programs, at a time of executing said program by evaluating a reliability required by said program, an execution computer from said plurality of computers for executing said program based on said computer reliability value held in said holding means of each computer of said plurality of computers and in accordance with said reliability of said program, so that each program of said plurality of programs is executed by a computer selected by said selecting means;

wherein a determination of said computer reliability value of each computer of said plurality of computers takes into account at least a number of processors contained in said computer and an error rate of said processors.

2. A highly reliable distributed computing system comprising:

a plurality of computers which are connected to a network for distributed processing of a plurality of programs, wherein each computer of said plurality of computers has a storage means for storing a value of computer reliability of said computer, and said computing system further comprises a program reliability storage means for storing values of program reliability respectively indicating a computer reliability required for each program to be executed by said computing system, and a reliability management program means for obtaining values of computer reliability from said computer reliability storage means of said plurality of computers, and for each program of said plurality of programs, determining at least one qualified computer of said plurality of computers having a value of computer reliability which is not less than a value of program reliability required by said program with reference to said program reliability storage means, and selecting, at a time of executing said program, an execution computer from said at least one qualified computer for executing said program based on a result of said determining, so that said plurality of programs are distributed to said plurality of computers on a basis of said values of computer reliability and said values of program reliability.

3. A highly reliable distributed computing system according to claim 2, wherein a determination of said value of computer reliability of each computer of said plurality of computers takes into account at least a number of processors contained in the computer and an error rate of said processors.

4. A highly reliable distributed computing system according to claim 2, wherein a management computer of said plurality of computers includes as said program reliability storage means, a program information table having information showing a relation of correspondence between names of said plurality of programs and said values of program reliability required for said plurality of programs.

5. A highly reliable distributed computing system according to claim 2, wherein said reliability management program means includes a polling means for making an inquiry into said plurality of computers to derive said values of computer reliability from said computer reliability storage means of said plurality of computers to thereby prepare a computer information table showing a relation of correspondence between said values of computer reliability, and names and addresses of said plurality of computers as derived as a result of said inquiry by said polling means.

6. A highly reliable distributed computing system according to claim 5, wherein said reliability management program means determines said at least one of said plurality of computers having a value of computer reliability which is not less than a value of program reliability required by said program with reference to said computer information table.

7. A highly reliable distributed computing system according to claim 2, wherein said reliability management program includes means for selecting, as to each of said plurality of programs, one of said plurality of computers having the value of the computer reliability not less than the value of program reliability of said each of said plurality of programs based on the result of said determining.

8. A highly reliable distributed computing system according to claim 2, wherein each computer of said plurality of computers has at least one processor, and said computer reliability value of each said computer of said plurality of computers is determined based on a situation where said at least one processor in said computer operates normally.

9. A highly reliable distributed computing system according to claim 2, wherein a determination of said value of computer reliability of each computer of said plurality of computers takes into account at least a number of processors contained in said computer, an error rate of said processors, a total number of disks in said computer, an error rate of said disks, a total number of communication buses in said computer, and an error rate of said communication buses.

10. A highly reliable distributed computing system according to claim 2, wherein said reliability management program means selects as said execution computer a computer having a lightest load from among said at least one qualified computer.

11. A highly reliable distributed computing system comprising: a plurality of computers which are connected to a network and executing a plurality of programs, wherein said plurality of computers include at least one fault tolerant computer, and each program of said plurality of programs includes a reliability flag indicating whether said program is a special program requiring high reliability processing or an ordinary program not requiring high reliability processing, and wherein a management computer of said plurality of computers includes a reliability management program for checking whether each encountered program of said plurality of programs to be executed is said special program or said ordinary program based on said reliability flag of said encountered program, for making said at least one fault tolerant computer execute said encountered program when said encountered program is determined to be said special program, and for making an ordinary computer execute said encountered program when said encountered program is determined to be an ordinary program.

12. A highly reliable distributed computing system according to claim 11, wherein said fault tolerant computer includes one of at least duplicated processors and at least triplicated processors, with each of said processors for executing said plurality of programs.

13. A highly reliable distributed computing system according to claim 11, wherein said fault tolerant computer includes said reliability management program.

14. A highly reliable distributed computing system according to claim 11, wherein said fault tolerant computer includes a multiprocessor for executing said plurality of programs.

15. A highly reliable distributed computing system comprising:

a plurality of computers which are connected to a network for executing a plurality of programs, wherein each computer of said plurality of computers has a holding means for holding a computer reliability value representing a reliability of said computer, and wherein one of said plurality of computers has a selecting means for automatically selecting, as to each program of said plurality of programs, at a time of executing said program by evaluating a reliability required by said program, an execution computer from said plurality of computers for executing said program based on said computer reliability value held in said holding means of each computer of said plurality of computers and in accordance with said reliability of said program, so that each program of said plurality of programs is executed by a computer selected by said selecting means;

wherein a determination of said computer reliability value of each computer of said plurality of computers takes into account at least a multiplexing number of processors contained in said computer, an error rate of said processors, a multiplexing number of disks in said computer, an error rate of said disks, a multiplexing number of communication buses in said computer, and an error rate of said communication buses.

16. A highly reliable distributed computing system comprising: a plurality of computers which are connected to a network and executing a plurality of programs, wherein at least one highly reliable computer of said plurality of computers is a fault tolerant computer, wherein each program of said plurality of programs includes a reliability flag indicating whether said program is a special program requiring high reliability processing or an ordinary program not requiring high reliability processing, and said computing system including a means for distributing encountered programs of said plurality of programs, so that, as to each said encountered program, one of said plurality of computers for executing said encountered program is determined based on said reliability flag of said encountered program.

17. A highly reliable distributed computing system comprising:

a plurality of computers which are connected to a network for distributed processing of a plurality of programs, wherein each computer of said plurality of computers has a computer reliability storage means for storing a value of computer reliability of said computer, and said computing system further comprises a program reliability storage means for storing values of program reliability respectively indicating a computer reliability required for each program to be executed by said computing system, and a reliability management program means for obtaining values of computer reliability from said computer reliability storage means of said plurality of computers, and for each encountered program of said plurality of programs, determining computers of said plurality of computers representing qualified computers, if any, for performing processing of said encountered program with each qualified computer having a value of computer reliability which is not less than a value of program reliability required by said encountered program with reference to said program reliability storage means, and, if at least one qualified computer is determined, selecting an execution computer from said at least one qualified computer for executing said program based on a result of said determining, so that said plurality of programs are distributed to said plurality of computers on a basis of said values of computer reliability and said values of program reliability.

* * * * *